United States Patent [19]

Bianchi

[11] Patent Number: 5,097,597

[45] Date of Patent: Mar. 24, 1992

[54] SPIRAL NUTCRACKER/GRINDER

[76] Inventor: Stephan Bianchi, 1353 Todd St., Mountain View, Calif. 94040-2929

[21] Appl. No.: 763,670

[22] Filed: Sep. 19, 1991

[51] Int. Cl.$^5$ .................. B26B 17/00; B26B 17/02; B02C 4/00

[52] U.S. Cl. .................. 30/120.2; 30/120.3

[58] Field of Search .......... 30/120.2, 120.3, 120.4, 30/120.5; 99/574, 577, 579, 568; 241/198 A, 198 R, 242, 243; D7/680

[56] References Cited

U.S. PATENT DOCUMENTS

| 1,248,313 | 11/1917 | Gradick, Sr. | 30/120.2 |
| 3,433,511 | 6/1886 | Watrous | 30/120.2 |
| 3,534,912 | 10/1970 | Brown | 241/242 |
| 4,425,707 | 1/1984 | Polsfuss | 30/120.3 |
| 4,819,331 | 4/1989 | Joyama | 241/242 |
| 4,964,215 | 10/1990 | Wu | 30/120.3 |
| 5,005,774 | 4/1991 | Martin et al. | 241/198 A |

Primary Examiner—Douglas D. Watts
Assistant Examiner—Paul M. Heyrana, Sr.

[57] ABSTRACT

A tool for the exertion of firm, well-modulated, compressional and shear force, ideally suited to the removal of nutshells by hand. An inclined surface moves alongside another surface, creating a V-shaped gap. Such movement will cause materials to be gripped, rolled, and crushed. This pair of surfaces is curved end-to-end around a central axis so that one becomes a circular cylinder, while the other assumes the form of a spiral curve, either around or within the first. One part rotates in relation to the other upon the central axis. The rotary-drum embodiment comprises a spiral curve (20a), the ends joined by a convex arc (22a), the resulting shape extended to form a cylinder. A web (38) spans one end of the cylinder to form a cup (40). The web serves to retain materials (92) being worked (such as edible nuts), as well as to support a central spindle (42) upon which a drum (22a) is turned by means of a key-shaped handle (46). The opposing surfaces (74 and 76) of the spiral and the drum are textured to hold the material more firmly as it is worked.

20 Claims, 6 Drawing Sheets

SPIRAL NUTCRACKER/GRINDER

BACKGROUND

1. Field of Invention

This invention relates to a compression and shear-producing tool, specifically to one which allows application of firm but gentle pressure for the purpose of shelling nuts.

2. Prior Art

The primary function of a nutcracker is to crack the shells of nuts so that one can extract the nutmeats cleanly and efficiently. A secondary purpose is to provide a functional toy or gadget which can entertain, amuse, or stimulate both adults and children.

Heretofore, hand-held nutcrackers have generally comprised two levers joined at one end. When squeezed between jaws set roughly parallel to these levers, the nut's shell would suddenly shatter, scattering fragments of the meat and shell.

In attempts to better modulate this action through improvement of mechanical advantage, nutcrackers have been invented having curved jaws set at angles to the levers. These attempts are exemplified in U.S. Pat. Nos. 343,351 to Watrous, June 8, 1886, and 4,425,707 to Polsfuss, Jan. 17, 1984. Unfortunately, the particular shapes chosen for these jaws, and the locations of the pivot points in respect to the jaws, ensures that for them to function as intended on a wide range of nuts, they would have to be constructed on an absurdly large scale.

At least one large-scale commercial nut husker has been invented which improves upon these two designs by turning one of the two curved surfaces upon its own circular axis: U.S. Pat. No. 4,819,331 to Joyama, Apr. 11, 1989, presents a commercial nut-husker comprising an internal rotor and an external stator having circular and semi-circular cross-sections respectively, and each having a plurality of cracking projections on their opposing surfaces. The stator is positioned so as to provide a decreasing gap between itself and the rotor, so that the circular rotor, turning on its axis, forces nuts of various sizes into the ever-narrower gap until they crack. However, the choice of two circular curved elements restricts the range of sizes of acceptable nuts to an unacceptable degree when the device is scaled-down to be hand-held.

There are many other types of nutcrackers on the market, combining in various ratios: inadequate precision, inadequate force, awkwardness, excessive size, excessive complexity, excessive operation time, and excessive production costs. Some nutcrackers employ screw-threads for exerting steady pressure, but these require additional time to be adjusted to fit each nut. Moreover, they must be reset for each nut even when cracking nuts of the same size. Jack-type nutcrackers also require adjustment and are also unnecessarily complicated.

OBJECTS AND ADVANTAGES

Accordingly, several objects and advantages of my invention are to provide a powerful and compact nutcracker. The compressional action of the jaws is multiplied as it is partially transformed into shearing action. This action also tends to roll the nut, applying the force to consecutive points on the shell, so that it is crushed more thoroughly, while avoiding damage to the nutmeats. This design maximizes the mechanical advantage available in a device with curved jaws, while minimizing its overall size.

Other objects and advantages are to contain the materials being worked, in most cases automatically holding them in the optimum position for the application of force and preventing the force from scattering them messily into the environment. A servo-like gripping action holds the material unaided by the user's fingers, allowing the operator to grind or grate materials without exposing her or his fingers to abrasion. Nuts and other materials in a wide range of shapes, sizes, and hardnesses may swiftly and easily be shelled by the use of my sturdy nutcracker. This nutcracker can be made extremely simply and inexpensively, or it can be made mechanically complex and intriguing. The overall form may also be made simple to be made simple or elaborate to appeal to differing tastes and budgets.

Further objects and advantages will become apparent from a consideration of the drawings and ensuing description.

REFERENCE NUMERALS IN DRAWINGS:

| | |
|---|---|
| 20a | spiral wall, preferred embodiment |
| 20b | spiral wall, alternative embodiments |
| 22a | arcuate wall, preferred embodiment |
| 22b | arcuate wall, alternative embodiments |
| 24a | circular wall, preferred embodiment |
| 24b | circular wall, alternative embodiments |
| 26 | center of rotation |
| 28 | center portion of gap |
| 30 | max. acceptable dimension of nut |
| 32 | min. dimension applicable to nut |
| 34 | max. approach of elements 20 & 24 |
| 36 | max. divergence of gap from center |
| 38 | web |
| 40 | cup |
| 42 | central spindle |
| 44 | rotor |
| 46 | rotor handle |
| 48 | cup striations |
| 50 | rotor striations |
| 52 | central spindle bore |
| 54 | central spindle socket |
| 56 | spindle seating flange |
| 58 | spindle lug socket |
| 60 | spindle lug |
| 62 | thrust washer |

| | -continued |
|---|---|
| 64 | cup handle |
| 66 | return spring |
| 68 | rotor spring hole |
| 70 | cup spring hole |
| 72 | rotor handle stop |
| 74 | jaw striations, cup |
| 76 | jaw striations, rotor |
| 78 | sun gear |
| 80 | planet gear |
| 82 | planet spindle |
| 84 | planet spindle bore |
| 86 | ring gear |
| 88 | gear shield |
| 90 | squared spindle end |
| 92 | Brazil nut |

DESCRIPTION OF PREFERRED EMBODIMENT: ROTARY-DRUM

Figures 1, 2:
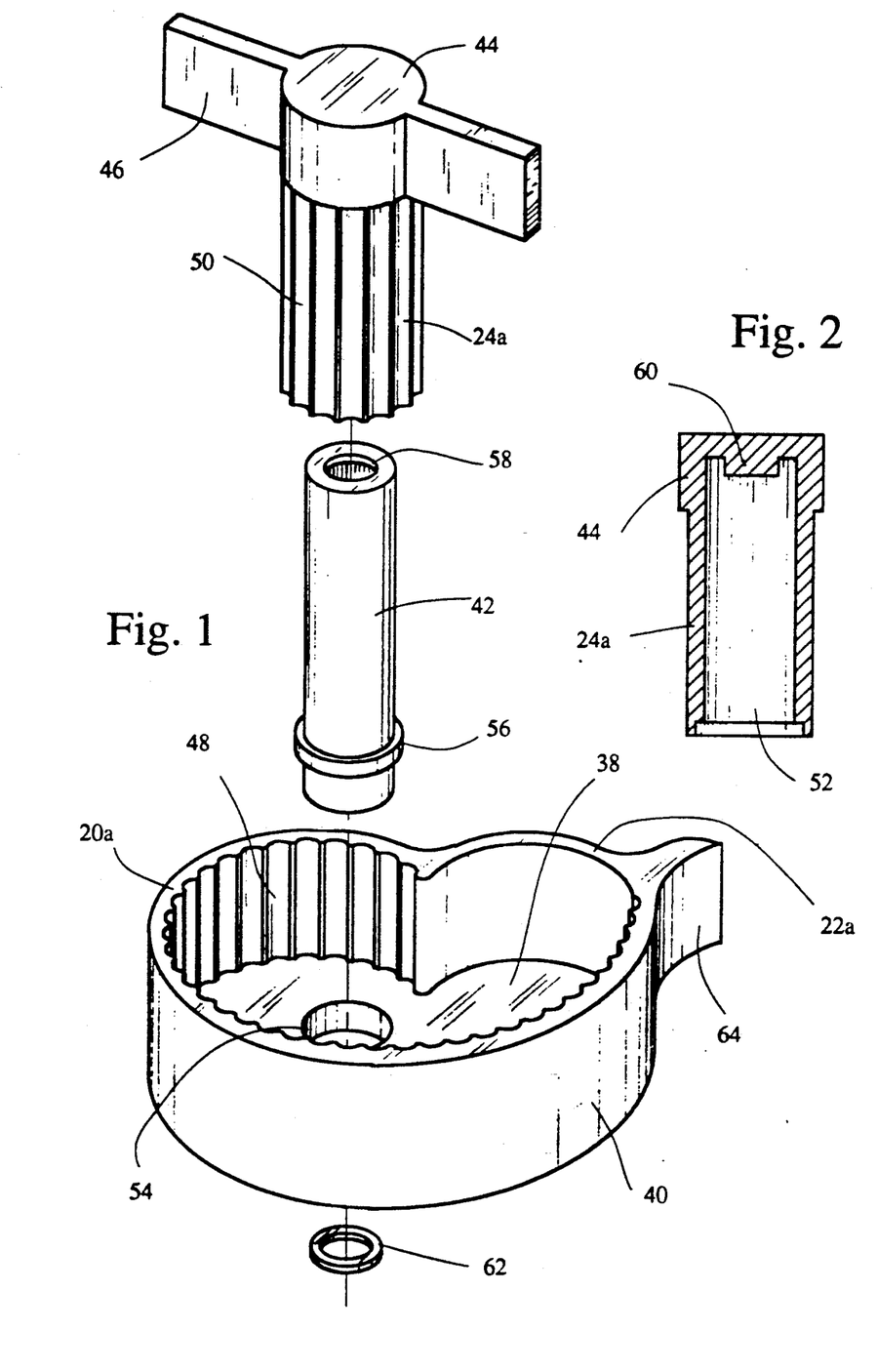
FIG. 1 shows an exploded view of the rotary-drum embodiment of a nutcracker according to my invention.
FIG. 2 shows a cross-section of a rotor used in the embodiment of FIG. 1.

FIG. 1 shows an exploded view of the preferred embodiment of a nutcracker according to my invention, to be referred to as the rotary-drum embodiment. It comprises a cup 40 in the form of a spiral wall 20a connected at both ends by an arcuate wall 22a and having a web 38 forming a bottom. A tubular spindle 42 is inserted into a spindle socket 54 in the center of the web until a spindle seating flange 56 rests against the web. The end of the spindle is swaged into place, capturing the web against the flange. A rotor 44, seen also in FIG. 2, having a circular outer wall 24a with a central bore 52 mated to the spindle, is fastened rotatably thereto by a lug 60. The lug protrudes into the upper end of the bore, where it fits into a socket 58 in the spindle and is swaged over a thrust washer 62, seen only in FIG. 1. A handle 46 is directly affixed to the rotor. A set of striations 48 textures the inner surface of wall 20a. Another set of striations 50 textures the exterior of wall 24a. A handle of grip 64 extends radially from the cup.

The cup and rotor are preferably cast aluminum. The spindle and washer are preferably steel. The section on geometry indicates preferred measurements.

OPERATION OF ROTARY-DRUM EMBODIMENT

Figure 3:
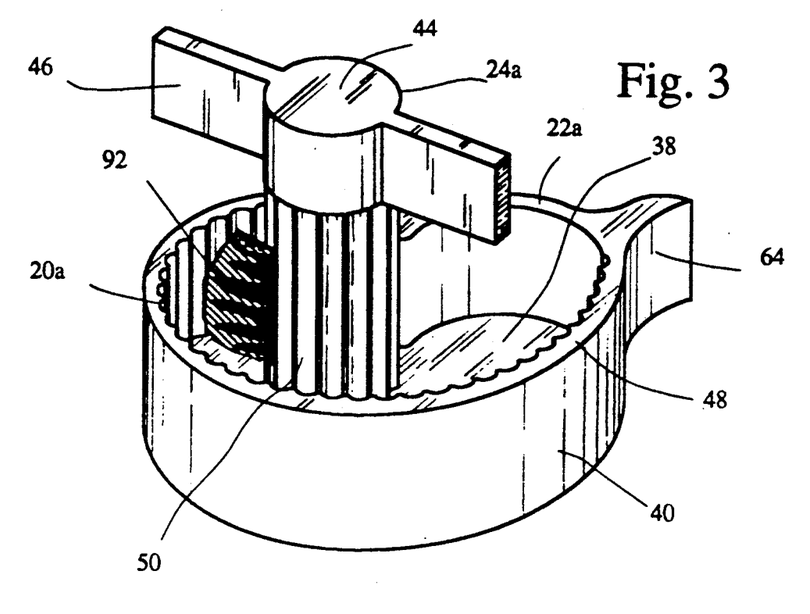
FIG. 3 shows an isometric view of the embodiment of FIG. 1.
Figure 4:
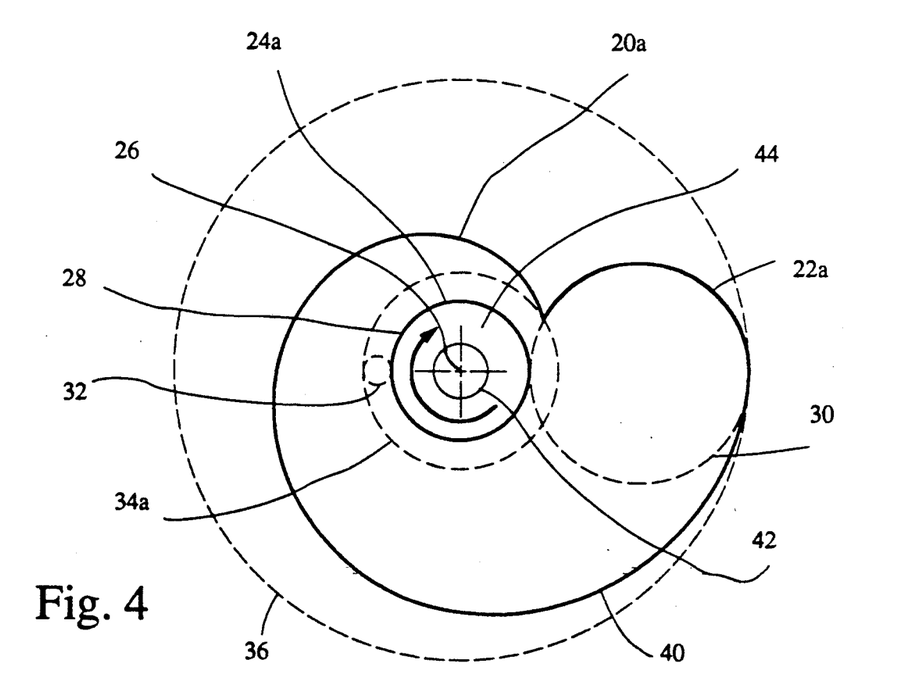
FIG. 4 shows a schematic of the geometry of the embodiment of FIG. 1.

Operation of the preferred rotary-drum embodiment can be deduced from FIGS. 3 and 4. While holding cup 40 steady, the user wedges a Brazil nut 92 into the gap between spiral wall 20a and circular wall 24a, where a set of cup striations 48 and rotor striations 50 grip it. The fingers and thumb of the operator's hand then press upon the opposite tabs of key-shaped rotor handle 46, causing the rotor to rotate clockwise, whereby the rotor rolls the nut against the ever-closer spiral wall. This wall applies increasing compressional and shear force to consecutive portions of the nutshell until it is gently cracked and separates into pieces. These pieces remain in the cup, so that the user can conveniently pluck the more resilient nutmeats, which are usually left intact, from among the broken bits of hard shell.

By swashing the device (tilting the device so that the angle of the tilt rotates around the central axis of the device) counter-clockwise, the operator can urge roundish nuts, such as walnuts and hazelnuts (filberts), swiftly into position without even touching them. This same action can be employed to grip nutmeg for grinding, as it is rounded but disinclined to crack. When the user desires to crack angular or sharp-edged nuts, such as Brazil nuts or almonds, it is most desirable to apply the pressure to their edges or corners. This is accomplished by positioning the nut vertically in the gap so that edge rests in the striations of the cup, while an opposing edge rests in striations of the rotor just towards the wider, counter-clockwise end of the gap. When the user turns the rotor in the direction of the narrowing gap, the striations, with the edges of the nutshell which they capture, draw nearer to each other. The shell wall bows outwards, increasing the included angles of the corners until the shell collapses.

This nutcracker applies the same gentle yet forceful rolling and shearing force to each nut regardless of size, whereas in the Polsfuss and Watrous designs, smaller nuts, positioned near the convergence of the jaws at the pivot point, are denied this action.

A substantial savings of materials and decrease in complexity is realized in production of this device as compared with other hand-held nutcrackers of similar effectiveness. Even the cheapest, simplest, nutcrackers generally have more moving parts and typically incorporate return springs. By eliminating the washer and forming the spindle as part of the cup, it is possible to cast the entire mechanism in two parts, and it can be assembled and used without fasteners. Merely by altering its dimensions, this device can be adapted to crack objects as large as coconuts or as small peppercorns.

Another function of the configuration as presented above is to grind solid, homogeneous materials such as nutmeg or hard cheese. As the pressure brought upon the workpiece grips it and jams it into the narrowing gap, the mounting pressure is not relieved by the collapse of an outer shell. Instead, the pressure exerted upon the piece by the striations of the drum increases, exceeding the shear strength of the surface. The advancing striations carve the surface away, pushing the granules thus freed around to the broadest portion of the gap. No other known nutcracker serves this function.

LEVERED-CAM EMBODIMENT

Figures 5, 6:
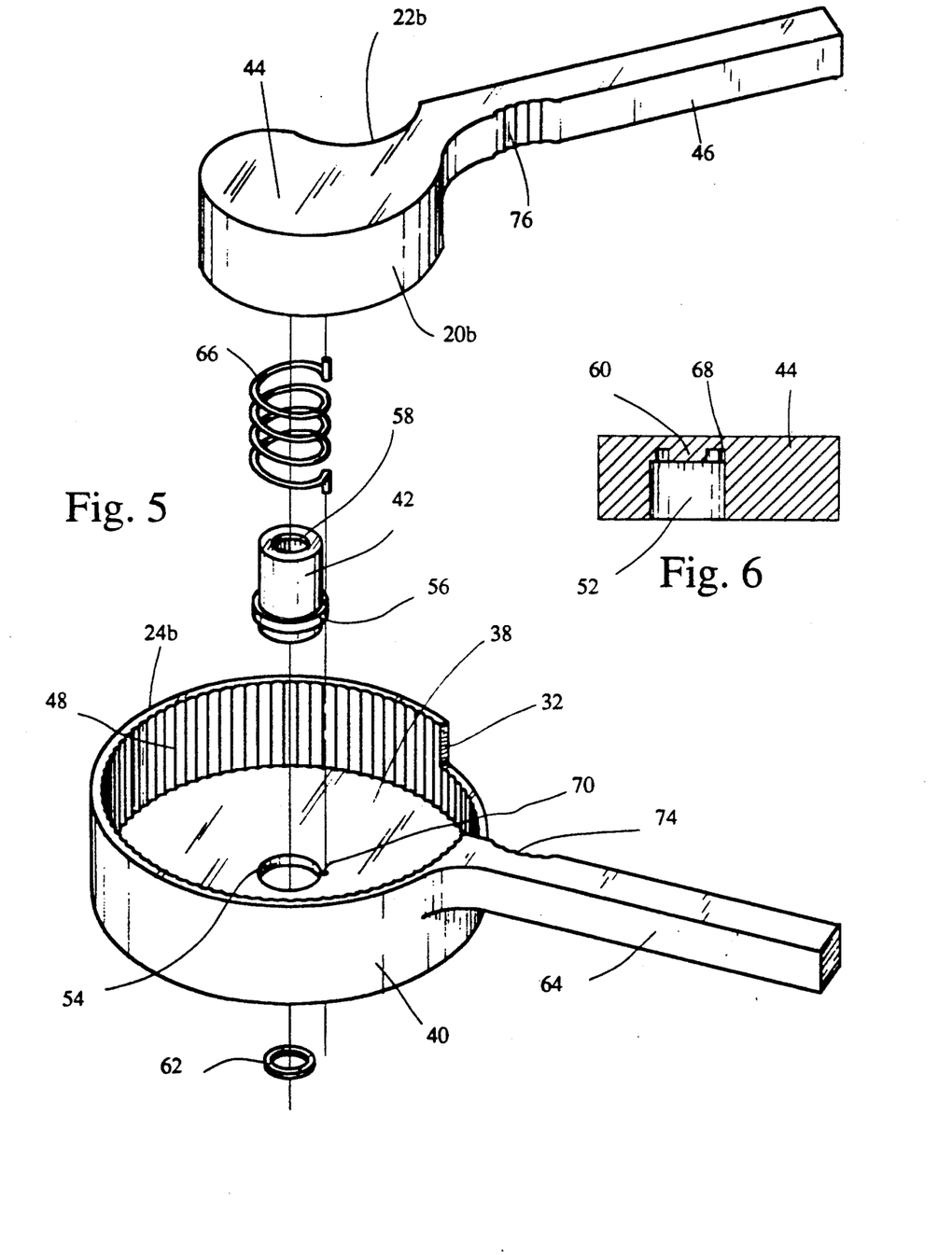
FIG. 5 shows an exploded view of a levered-cam embodiment of a nutcracker according to my invention.
FIG. 6 shows a cross-section of a rotor used in the embodiment of FIG. 5.

A levered-cam embodiment is shown in FIG. 5. It comprises a cup 40 having a circular wall 24b and a web 38 forming a bottom. A tubular spindle 42 is inserted into a spindle socket 54 in the center of the web until a spindle seating flange 56 rests against the web. The end of the spindle is swaged into place, capturing the web against the flange. A rotor 44, seen also in FIG. 6, having an outer wall comprising a spiral 20b with its end connected by an arc 22b, and a central bore 52, mated to the spindle, is fastened rotatably thereto by a lug 60. The lug protrudes into the upper end of the bore, where it fits into a socket 58 in the spindle and is swaged over a thrust washer 62, seen only FIG. 5. A handle 46 is affixed to the rotor and extends radially past wall 24b. A set of striations 48 textures the inner surface of wall 24b. A handle 64 radially from the top of the cup.

A clockwise torsional return spring 66 resides in the bore, wound about the spindle, urging the rotor handle away from the cup handle. One end of the spring is captured by a hole 68 located in the rotor and parallel to the bore. The other end of the spring is captured by another hole 70 located in the web and parallel to the spindle. A stop 32, located on top of the circular wall, resists the force of the spring upon the rotor handle, preventing it from being forced out of reach of the cup handle. The opposing surfaces of the cup and rotor handles just outside the cup have jaw striations 74 and 76.

As before, the cup and rotor are preferably made of cast aluminum. The spring, spindle and washer are preferably made of steel.

OPERATION OF LEVERED-CAM EMBODIMENT

Figure 7:
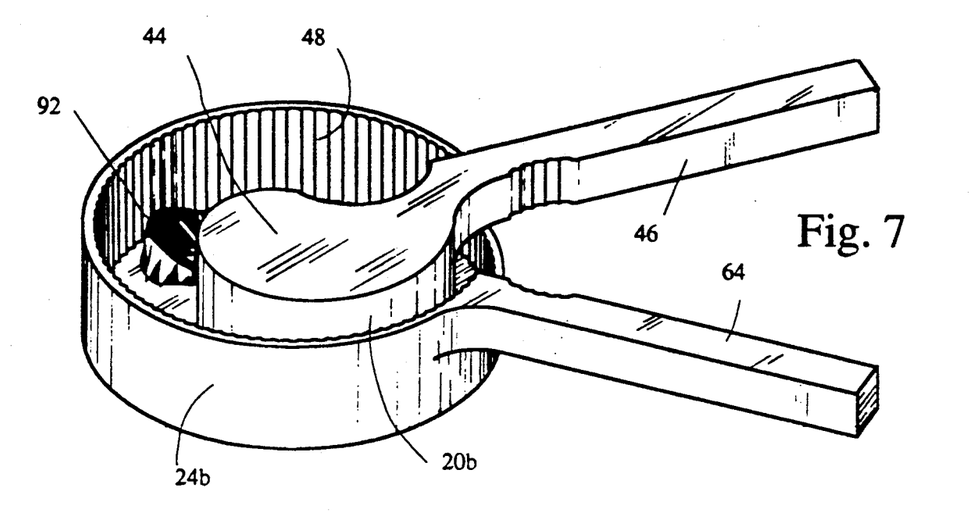
FIG. 7 shows an isometric view of the embodiment of FIG. 5.
Figure 8:
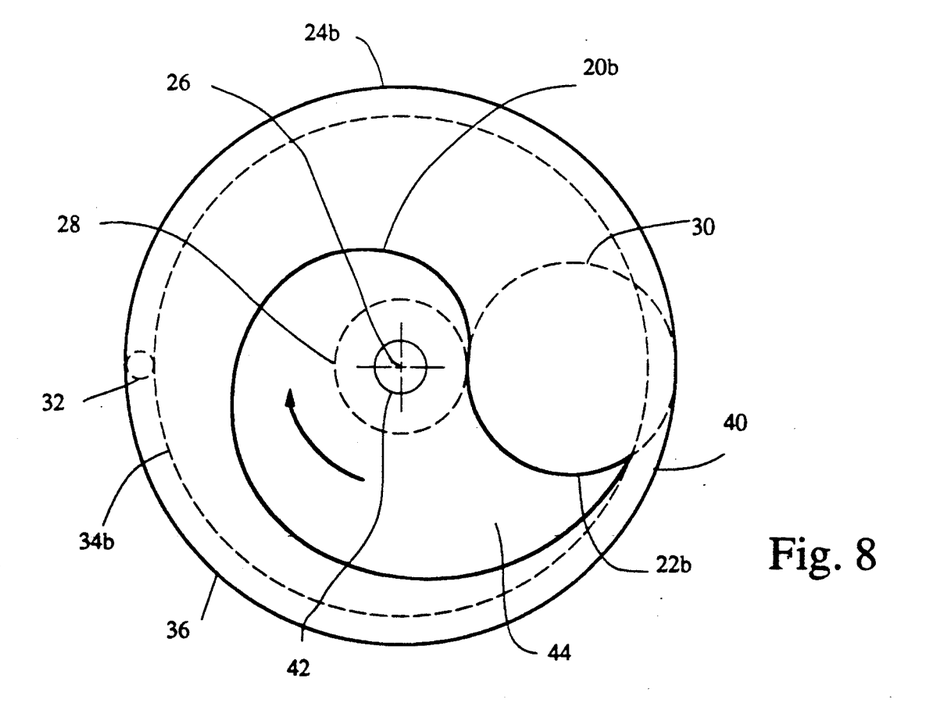
FIG. 8 shows a schematic of the geometry of the embodiment FIG. 5.

Operation of the levered-cam embodiment of the nutcracker may be deduced from FIGS. 7 and 8.

While lightly grasping handles 46 and 64, the user place a Brazil nut 92 flat on the bottom web and slides it snugly into the gap between walls 20b and 24b. When cracking other, round, nuts, the operator may roll them into place merely by tilting the nutcracker. She or he then squeezes the handles together, causing the rotor to turn clockwise. The striations 48 of wall 24b hold the nut while wall 20b sweeps out against it, compressing it and rolling it slightly. The shell collapses, remaining in the cup along the nutmeats. Release of the compressive force applied to the handles allows the spring to return the rotor handle to its original position, resting against the stop.

Alternatively, the corners of an almond or other nut may be placed between the jaw striations. The handles may then be squeezed together against the nut as they would in a standard nutcracker.

The broader curves of the gap and the deceased sweep of the rotor in this embodiment combine to make it superior to the rotary drum embodiment for cracking many nuts and the best nutcracker for Brazil nuts. Additionally, it requires less muscular strength than does the rotary drum embodiment, and can be used as easily with either hand. Furthermore, it is less apt to grind nutshells when the intention is to crack them.

DESCRIPTION OF GEARED-CAM EMBODIMENT

Figure 9:
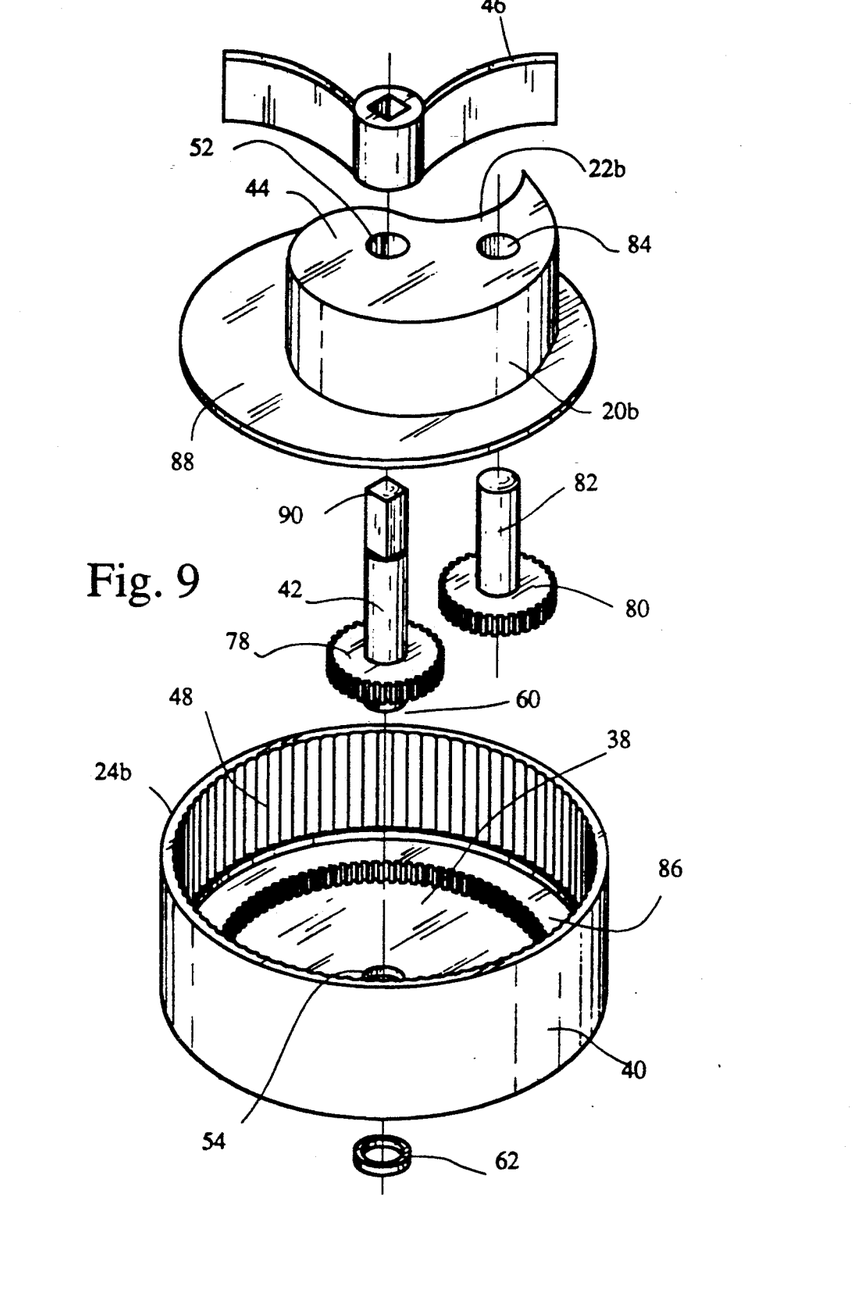
FIG. 9 shows an exploded view of the embodiment of a nutcracker according to my invention.

FIG. 9 shows a geared-cam embodiment of a nutcracker according to my invention. It comprises a cup 40 having a circular wall 24b and a web 38 forming a bottom. A ring gear 86 is fixedly located in the bottom of the cup, its teeth pointing towards the center of the ring. A spindle 42 is secured rotatably in a central hole 54 in the web by a lug 60 which is swaged over a thrust washer 62. The web is captured between the washer and a sun gear 78 which is fixedly attached to the spindle and held parallel to the ring gear. A rotor 44 comprising a spiral wall 20b, connected at both ends by an arcuate wall 22b, is fixedly attached at the bottom to a disc 88. The disc fits within the circular wall above the gears, parallel to the web and concentric to a central bore 52 which passes through the rotor and mates rotatably to the spindle. A planet gear 80 is parallel to the other two gears and is captured between them. It is solidly affixed to another 82 which is mated rotatably to another bore 84 also located within the rotor and parallel to the central bore. A rotor handle 46 is pressed onto a squared portion 90 of the upper end of the spindle 42. A set of striations 48 textures the internal surface of wall 24b.

All parts are preferably brass except for the rotor and disc which are preferably cast aluminum, and the washer which is preferably steel.

OPERATION OF THE GEARED-CAM EMBODIMENT

Figure 10:
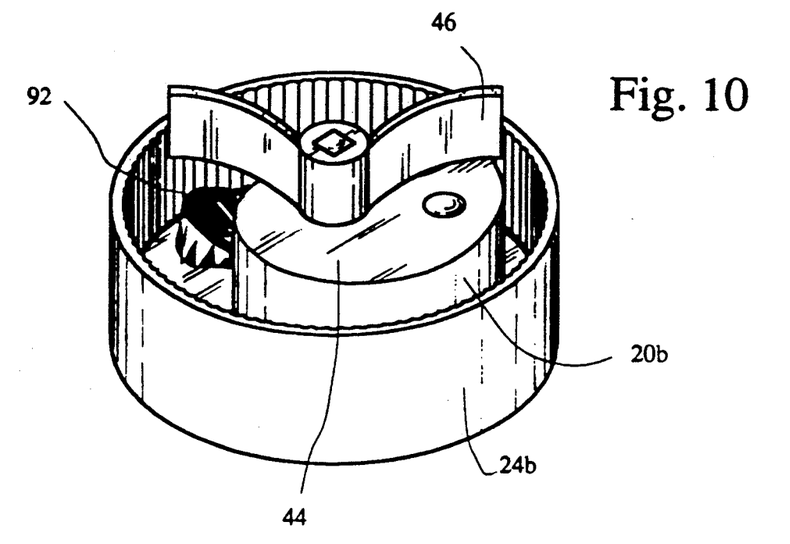
FIG. 10 shows an isometric view of the embodiment of FIG. 9.
Figure 11:
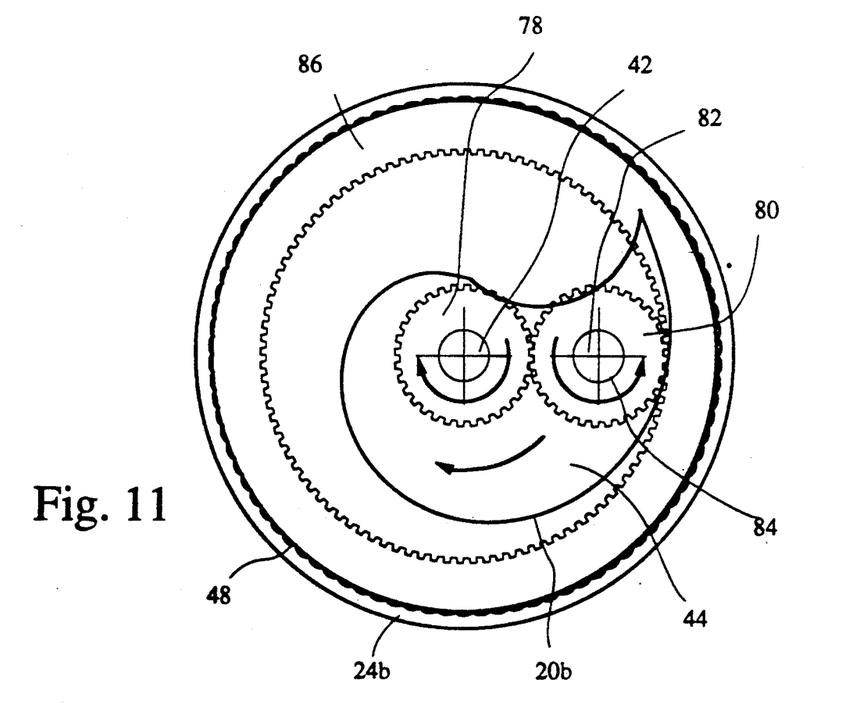
FIG. 11 shows a schematic of the geometry of the embodiment of FIG. 10.

Operation of the geared-cam embodiment of the nutcracker can be deduced from FIGS. 10 and 11. The operator holds the cup upright. She or he rolls or wedges nut 92 between spiral wall 20b and circular wall 24b. The user then rotates handle 46, which in turn rotates center spindle 42 and thereby sun gear 78. The sun gear rotates planet gear 80 along inside of ring gear 86 and about its spindle 82, by which it urges, through action upon bore 84, the turning of rotor 44. Thus a full rotation of the handle effects a lesser rotation of the rotor about its center spindle. The striations 48 of wall 24b hold the nut while wall 20b sweeps about against it, compressing it and rolling it slightly. The shell is broken, remaining in the cup along with the nutmeats.

This geared-cam embodiment combines much of the compactness and external simplicity of the rotary-drum embodiment with the increased power of the levered-cam embodiment while its intriguing complexity of action suits it to the novelty market. The circular of this embodiment adapts it best to the center of a serving bowl.

DESCRIPTION OF GEOMETRIC ELEMENTS AND THEIR RELATIONSHIPS

FIGS. 4 and 8 show diagrams of the elements of the nutcrackers of FIGS. 1 and 5 arranged in two configurations, each with the purpose of establishing minimum size and maximum mechanical advantage. Rotor 44 rotates in relation to cup 40 on a center of rotation 26. Circle 28 represents the minimum radius of the exterior of the rotor from the center. This limit is determined by the thickness of materials necessary to the rotor, and to spindle 42 upon which it rotates, to achieve the required strength and to provide a proper bearing surface between them. An acceptable radius is 12 mm, but in FIG. 8 this can be reduced to zero by placing these elements outside of the cup, under the web.

In FIG. 4, circle 28 represents the smallest diameter permissible for circular wall 24a of the rotor and is determined also by requirements for frictionally effective surface area, mechanical advantage, etc. A diameter of 24 mm is acceptable for a hand-held device. A circle 30 represents the maximum dimension of the cross-section of a nut which the device can accept prior to cracking it. For a hand-held device, a large walnut suggests a diameter of 38 mm, though a coconut might suggest 150 mm for a commercial application. A circle 32 represents the minimum dimension this device can force a nut into. Acorns and pistachios suggest a 5 mm diameter, though this dimension can be reduced to less than 1 mm for milling peppercorns, coffee beans, or cereal grains, but with an increased danger of jamming. A circle 36 represents the maximum divergence of the interior of cup 40 from center 26. It is concentric about the center and its radius is determined by adding the diameter of circle 30 to the radius of circle 28.

In FIG. 8, circle 36 represents the interior of a circular wall 24b of the cup. A circle 34b, also concentric about the center, represents the maximum approach of a spiral wall 20 to the wall 36 throughout its path of rotation. It is located between circle 28 and circle 36 at a distance of the diameter of circle 32 from 24a in FIG. 4 and from 24b in FIG. 8. Spiral wall 20a or 20b winds from a point where circle 34a or 34b intersects circle 30, around the center of rotation until it reaches the intersection of circle 30 with circle 36 in FIG. 4 or with circle 28 in FIG. 8.

For each degree of travel around the center, the spiral proceeds an equal distance away from it. A segment of circle 30 links the two ends of the spiral to form a contiguous wall: the wall of the cup 22a in FIG. 4 or the wall of the rotor 22b in FIG. 8. The rotor is turned so that towards most points on the circular wall, the spiral wall gradually draws closer, clockwise in the configurations illustrated by these drawings. Minimum overall size is determimined by the minimum values given for circles 28 and 30. Maximum mechanical advantage is determined by the values given for circles 30 and 32, similar values producing a more gradual inclination of the spiral, and by the maximum length of the spiral about the center.

SUMMARY, RAMIFICATIONS AND SCOPE

Accordingly, the reader will see that my nutcracker cracks nuts more swiftly, more securely, and yet more gently than do others. It contains the fragments in the interest of neatness and efficiency. The user can arrange these fragments in the cup, easily plucking out the nutmeats before discarding the debris. It automatically positions and processes round nuts according to their sizes. It can crack any nut small enough to fit into the device, regardless of its shape or hardness. It is simple and easy to use. It can be produced in a variety of sizes and in various attractive forms, easily suited to a position as a centerpiece on a serving bowl. In the rotary-drum embodiment, it is small and lightweight; it is extremely simple and inexpensive to manufacture. It excels in cracking Brazil nuts and can also grind nutmeg. In its levered-cam embodiment, it is the best nutcracker for use on Brazil nuts. Additionally, this embodiment requires less muscular strength than do most other nutcrackers, and can be used as easily with either hand. In its geared-cam embodiment, its intriguing complexity of action suits it to the high-priced novelty market.

While the above description contains many specificities, these should be construed as limitations on the scope of invention, but rather as an exemplification of the preferred embodiment and two alternative embodiments thereof. Many other variations are possible. For example, the handle on the cup may be a long lever, or it may be replaced with splines, or it may be omitted. The cup may be supplied with some means of securing it to a post or tabletop or to a nut serving bowl. It may positioned so as to spin on a horizontal axis in order to expel shell fragments into a container below.

Also, the key-shaped rotor handles may be replaced with a lever or vice-versa. The rotor may be turned by an electric motor or other power supply. The web may have openings for the introduction or expulsion of materials. Any of the curved walls may have openings for this purpose. The striations may assume forms other than those shown. They may be arranged so as to decrease in size and/or increase in number as they approach the narrower portion of the gap. They may be omitted on one or more of the walls, permanently, or by means of removable inserts. They may be replaced by indentations or stubs.

Further, a disc may be attached to the rotor, covering the gap to keep shards from ejecting. Particularly in this case, the rotor may be made removable by deletion of the lug, or semiremovable by a spring-loaded rotor-mounted ball snapping into an annular groove in the spindle or by other means. Other means of permanent attachment may be substituted. In any configuration, alternative methods of fastening the spindles to the rotor may be employed. They may be swaged, clipped, screwed, pinned, or otherwise fastened. To maximize bearing surface, the spring of the levered-cam embodiment may be located within the hollow spindle, acting upon a horizontal hole or groove in the spindle and upon a groove in the lug. Alternatively, to maximize strength, the spindle may be solid. In either case, the spindle may be cast in one piece with the cup.

In addition, the rotor can be made smaller by relocating the spindle bearing surface to the underside of the web. The direction of the spiral may be permanently reversed or made reversible by transfer of the web and spindle from one side of the spiral to the other, or by other means, converting the device to left-handed or right-handed operation.

Moreover, the device can be tilted permanently or temporarily from horizontal. It may be turned upside-down. The handles may be affixed to the bottom. They may fold or telescope. They may be hollowed out to hold nut picks or priers. The walls of the circle and/or spiral may be curved or grooved for optimum location of pressure applied to the nutshell. The bottom of the cup may rise from full depth in the semi-circle to cause the narrow end of the gap to be shallow to keep small nuts accessible, or the wall of the cup can recede to the same purpose. The device can be altered as above for milling coffee beans, peppercorns, cereal grains, or for grating hard cheese, ginger, garlic, etc.

The washers may be deleted. The parts of the device, with the exception of the spring, may be made of cast aluminum, cast iron, cast glass-reinforced plastic or pressed sheet steel.

Therefore, the scope of the invention should be determined by the amended claims and their legal equivalents, and not by the examples given.

I claim:

1. A compression and shear-producing tool for compressing, crushing, or grinding materials in a range of sizes and shapes, comprising:
   (a) a first cylinder or essentially circular cross-section, having a central axis;
   (b) a second cylinder of essentially spiral cross-section, the spiral being drawn out regularly from a central axis; and
   (c) means for locating said first and second cylinders so that said central axis of said spiral is concentric with said central axis of said first circular cylinder, said first cylinder being sufficiently small so as to enable it to be located within the said second cylinder so as to form a gap between said cylinders, said gap between said cylinders narrowing in a circular direction, such that the rotation of one of said cylinders relative to the other causes materials placed into said gap to be drawn into the decreasing width of said gap, whereby they are compressed, crushed, or ground.

2. The tool of claim 1 wherein the said cylinders have opposing surfaces which define said gap, said opposing surfaces being textured so as to grip materials placed between them.

3. The tool of claim 1, further including a wall spanning one side of said gap so as to retain the materials compressed between said cylinders.

4. The tool of claim 1 wherein said cylinders are small enough to be hand-held.

5. The tool of claim 1 wherein said first cylinder is located within said second cylinder, so as to form a rotary-drum.

6. The tool of claim 1, further including a projection on said first cylinder so as to form a handle or handgrip.

7. The tool of claim 1, further including a projection on said second cylinder so as to form a handle or handgrip.

8. The tool of claim 1 wherein said second cylinder is located within said first cylinder, so as to form a rotary cam.

9. The tool of claim 1, further including a plurality of handles, respectively affixed to said two cylinders, said handles being shaped so that when drawn together, they effect rotation of said cylinders.

10. The tool of claim 1, further including a spring for restoring an initial relationship between said two cylinders following each use.

11. The tool of claim 10, further including a stop for restricting the action of said spring.

12. The tool of claim 1, further including means for multiplying the force transmitted between said cylinders.

13. The tool of claim 12 wherein said means for multiplying comprises a plurality of meshing gears.

14. The tool of claim 1 wherein said first cylinder is not entirely circular.

15. A nutcracker: comprising:
   (a) a rotatable center cylindrical member having a textured external surface of rotation;
   (b) a concentrically surrounding cylindrical member having a textured internal surface of rotation which faces, and is concentric to, said external surface of rotation, said surface of at least one of said cylinders forming a spiral drawn regularly out from the central axis;
   (c) means for locating said first and second cylinders so that said central axis of said spiral is concentric with said central axis of said first circular, said first cylinder being sufficiently small so as to enable it to be located within the said second cylinder so as to form a gap between said cylinders, said gap between said cylinders narrowing in a circular direction, such that the rotation of one of said cylinders relative to the other causes materials placed into said gap to be drawn into the decreasing width of said gap, whereby they are compressed, crushed, or ground; and
   (d) means for rotating said center member with respect to said surrounding member.

16. The nutcracker of claim 15 wherein said central cylindrical member forms said spiral.

17. The nutcracker of claim 15 wherein said surrounding cylindrical member forms said spiral.

18. The nutcracker of claim 15 wherein said means of rotation consists of levers affixed to each of said two cylindrical members.

19. The nutcracker of claim 18 wherein said levers are drawn toward each other by an elastic member.

20. The nutcracker of claim 15 wherein said means of rotation comprises a plurality of meshing gears.

* * * * *